United States Patent
Widemann

Patent Number: 5,121,603
Date of Patent: Jun. 16, 1992

[54] DEVICE FOR PRESSURE-REGULATED VARIABLE DISPLACEMENT MOTORS WITH RPM-DEPENDENT SET PRESSURE COMPENSATION

[75] Inventor: Axel Widemann, Neümunster, Fed. Rep. of Germany

[73] Assignee: Sauer-Sundstrand GmbH & Co., Neumunster-Wittorf, Fed. Rep. of Germany

[21] Appl. No.: 600,440

[22] Filed: Oct. 19, 1990

[30] Foreign Application Priority Data

Oct. 20, 1989 [DE] Fed. Rep. of Germany ....... 3935068

[51] Int. Cl.⁵ ............................................. F16D 31/02
[52] U.S. Cl. ........................................ 60/447; 60/490
[58] Field of Search ................. 60/443, 447, 449, 488, 60/490

[56] References Cited

U.S. PATENT DOCUMENTS

| | | | |
|---|---|---|---|
| 3,054,263 | 9/1962 | Budzich | 60/447 |
| 3,797,244 | 3/1974 | Waters | 60/443 |
| 3,981,374 | 9/1976 | Johns | 60/449 |
| 3,986,357 | 10/1976 | Hoffman | 60/447 |
| 4,596,118 | 6/1986 | Heiser | 60/447 |
| 4,712,377 | 12/1987 | Yoshida et al. | 60/445 |
| 4,745,746 | 5/1988 | Geringer | 60/447 |
| 4,932,208 | 6/1990 | Koyama et al. | 60/488 |

FOREIGN PATENT DOCUMENTS 3120278 3/1981 Fed. Rep. of Germany ........ 60/447

OTHER PUBLICATIONS

Sauer-Sundstrand Service Handbook entitled "Hydrostatic Power System", Series 20+50, 1987, pp. 1-16.
Sauer-Sundstrand Service Handbook entitled "Sauer Automatic Transmission FBA: Standard Design for Axial Piston Variable Pumps".
Sauer-Sundstrand technical information publication entitled "Axial Piston Motors" Series 50, May 1988, pp. 1-16.
"Oilhydraulic Applications" (1971) by H. Ebertsäuser, pp. 146-151, was cited by the German Patent Office as technical background in connection with Applicant's corresponding German Application.
Author: Prof. Dipl.-Ing. H. Ebertshauser, Title: Anwendungen der Olhyraulik Teil I Date: Dec. 1971 (assumed) Pertinent Pages "Foreword" and 146-151.

*Primary Examiner*—Edward K. Look
*Assistant Examiner*—F. Daniel Lopez
*Attorney, Agent, or Firm*—Roper & Quigg

[57] ABSTRACT

A hydrostatic system includes a variable displacement hydraulic motor whose absorption volume is adjusted by a pressure regulator, depending on the rpms generated by the power source driving the system. The apparatus enables the variable displacement motor to fully utilize the drive power avaiable from the power source over a range of operating speeds.

15 Claims, 2 Drawing Sheets

ABSTRACT
DEVICE FOR PRESSURE-REGULATED VARIABLE DISPLACEMENT MOTORS WITH RPM-DEPENDENT SET PRESSURE COMPENSATION

BACKGROUND OF THE INVENTION

1. Field of the Invention

The invention relates to a hydraulic motor with variable absorption volume and also to a hydrostatic mechanism which includes such a variable displacement motor.

2. Description of the Prior Art

The invention is used chiefly in wheel loaders, fork lifts, and similar work vehicles. Such work vehicles often have a hydrostatic mechanism, also called a hydraulic mechanism or hydraulic drive system, in addition to working hydraulics. The power for driving the hydrostatic mechanism is created by a common vehicle motor, for example, a diesel engine.

SUMMARY OF THE INVENTION

A hydrostatic mechanism comprises the combination of a pump and a hydraulic motor, as disclosed in the Sauer-Sundstrand service handbook entitled "Hydrostatic Power System," Series 20+50, 1987, pages 1-16, for example. The working power of the diesel engine is transferred by the pump to the hydraulic motor by means of a hydraulic circuit. High pressure fluid, also called working pressure, is admitted to one of two connections to the hydraulic motor. In this context, the hydraulic system pressure between the pump and the hydraulic motor is considered high pressure fluid. Hydraulic oil at the other connection, referred to as filling pressure fluid or feeding pressure fluid, is under considerably less pressure and is produced separately inside the pump.

The pump is a variable displacement pump, i.e., a hydraulic pump with variable volumetric displacement. The variable displacement pump is adjusted using a control block, as disclosed in the Sauer-Sundstrand service handbook entitled "Sauer Automatic Transmission FBA: Standard Design for Axial Piston Variable Pumps". By using such a mechanism having a sequence of automatic operations, auto-conforming or automotive driving of the working vehicle is achieved. The term "auto-conforming driving" means that the desired velocity is provided by actuating the diesel motor accelerator. Driving velocity is adjusted proportionally to the accelerator adjustment as long as the pressure of the high pressure fluid does not exceed 80 bar. At further increasing high pressures (triggering the drive motor, the diesel motor, for example), the fixed connection between accelerator position and driving velocity is inactivated. Depending on the diesel engine driving power available and on the travelling resistance, the driving velocity is controlled so that the driving motor is not triggered in a manner that would cause an overload. As a result of the internal restoring forces, the feed stream in the working circuit is decreased under increasing working pressures.

The pump feed stream is essentially determined by the difference in pressure between an actuating fluid pressure and the filling fluid pressure, already mentioned, which functions as a constant reference pressure. This difference in pressure causes the displacement of a rocking disk in the pump by one or more variable displacement cylinders. The difference between the actuating fluid pressure and the filling fluid pressure depends on the rpms of the shaft which connects the diesel engine to the variable displacement pump.

The difference in pressure amounts to some 2 bar for starting and some 15 bar for the pump's maximum feed stream, which is achieved at average revolutions per minute. A properly adjusted drive puts the vehicle in motion at diesel rpms of 1,000 to 1,200 revolutions per minute. The pump is then displaced by the changing actuating fluid pressure to its maximum feed volume, this having to occur at still relatively low rpms (1,500 to 1,700 revolutions per minute).

The feed stream produced by the pump is pumped into the hydraulic motor through the high pressure connection and is returned to the pump in a closed circuit. In general, rather than a fixed displacement motor, a variable displacement motor is used, namely, a hydraulic motor with a variable absorption volume. Such a variable displacement motor is disclosed in the Sauer-Sundstrand technical information publication, "Axial Piston Motors", Series 50, 5/88, pp. 1-16, for example. The amount of oil, in $cm^3$, which the variable displacement motor takes up in one rotation of its shaft is considered the absorption volume. The adjustment of the absorption volume between a minimum and maximum value occurs using a control piston moving inside a control cylinder, the control piston traversing the angle between the working piston and the shaft between a minimum and maximum position. The minimum pivoting angle can be 8°, for example, while the maximum pivoting angle is 40°. The factor of 4.6 between the maximum and minimum absorption volume, for example, is referred to as the displacement range. Adjustment can be conducted under a load and with short displacement times.

The variable displacement motor can be equipped with a great variety of regulation and displacement devices. A variable displacement principle, abbreviated VMA, will be drawn upon as the basic variable displacement structure upon which the invention is constructed, while another known regulation means, abbreviated RDM, will serve as a comparison.

RDM designates a fixed displacement pressure regulator in which the absorption volume can be continuously adjusted by hydraulic proportional displacement. The working fluid pressure at the variable displacement motor, i.e., the high pressure fluid, delivers not only the adjusting pressure internally to the control cylinder, but also determines the extent of the displacement. The regulator is adjusted at a regulating beginning and a minimal absorption volume. From the regulating beginning, i.e., as soon as the high pressure achieves the adjusted motor regulating pressure, the regulating circuit sees to it that the adjusted pressure on the motor is constant.

In contrast, a variable displacement principle (VMA) indicates an actuating fluid pressure and high pressure fluid dependent two-point adjustment of the absorption volume at variable high pressures. The regulating beginning is the same as for the RDM regulation, i.e., the motor regulating pressure in practice varies between 170 and 250 bar, depending on the application. In contrast to the purely pressure-regulated motor (RDM), in VMA the displacement of the absorption volume is released at smaller values by an external actuating pressure, and this is done by actuating fluid pressure which is provided by the variable displacement pump having a sequence of automatic operations. This actuating fluid pressure is produced by a filling and actuating pump which sits together with the variable displacement pump on the drive shaft of the diesel engine. VMA variable displacement offers advantages in driving comfort and allows precise driving as well as simple shunting. The main factors contributing to this are the start up, which occurs basically at the large angle of the hydraulic motor, and shifting, which takes place at a certain rpm.

The invention, then, assumes a variable displacement motor in a hydrostatic mechanism in which the actuating fluid pressure, which is produced in the variable displacement pump's sequence of automatic operations and which represents a quantity n of rpms, is also used to influence the high pressure fluid in the variable displacement motor.

The invention enables full utilization of the hydraulic power available from the diesel engine during operation in the average rpm range, and transfer of this power to driving power, by deliberately adapting the absorption volume of the variable displacement motor to the hydrostatic system pressure.

The invention is based on the recognition that the motor regulating pressure in the variable displacement motor is too low in existing systems during operation of the diesel engine in the average rpm range. This leads to the diesel engine no being fully utilized in the average rpm range and the drive system not running economically. As discussed above, existing systems drive either with a continuously regulated pressure independent of the rpms (RDM) or with a motor regulating pressure which, although it is variable, is smaller at average rpms than the fixed regulating pressure (VMA).

The present invention, on the other hand, instructs a reversed adaptation, i.e., the motor regulating pressure should be higher at average rpms of the diesel engine than at the maximum rpm. The invention does not limit triggering of the driving motor at values which are too small, but rather at rpm-dependent possible values.

The invention has a special advantage in that the switch point from a maximum absorption volume toward a minimum absorption volume can be adjusted completely independently from the motor regulating pressure. In this way, the switch point from large to small absorption volume can be significantly better adapted to the characteristics of the motor vehicle.

DETAILED DESCRIPTION OF THE INVENTION

Figure 1:
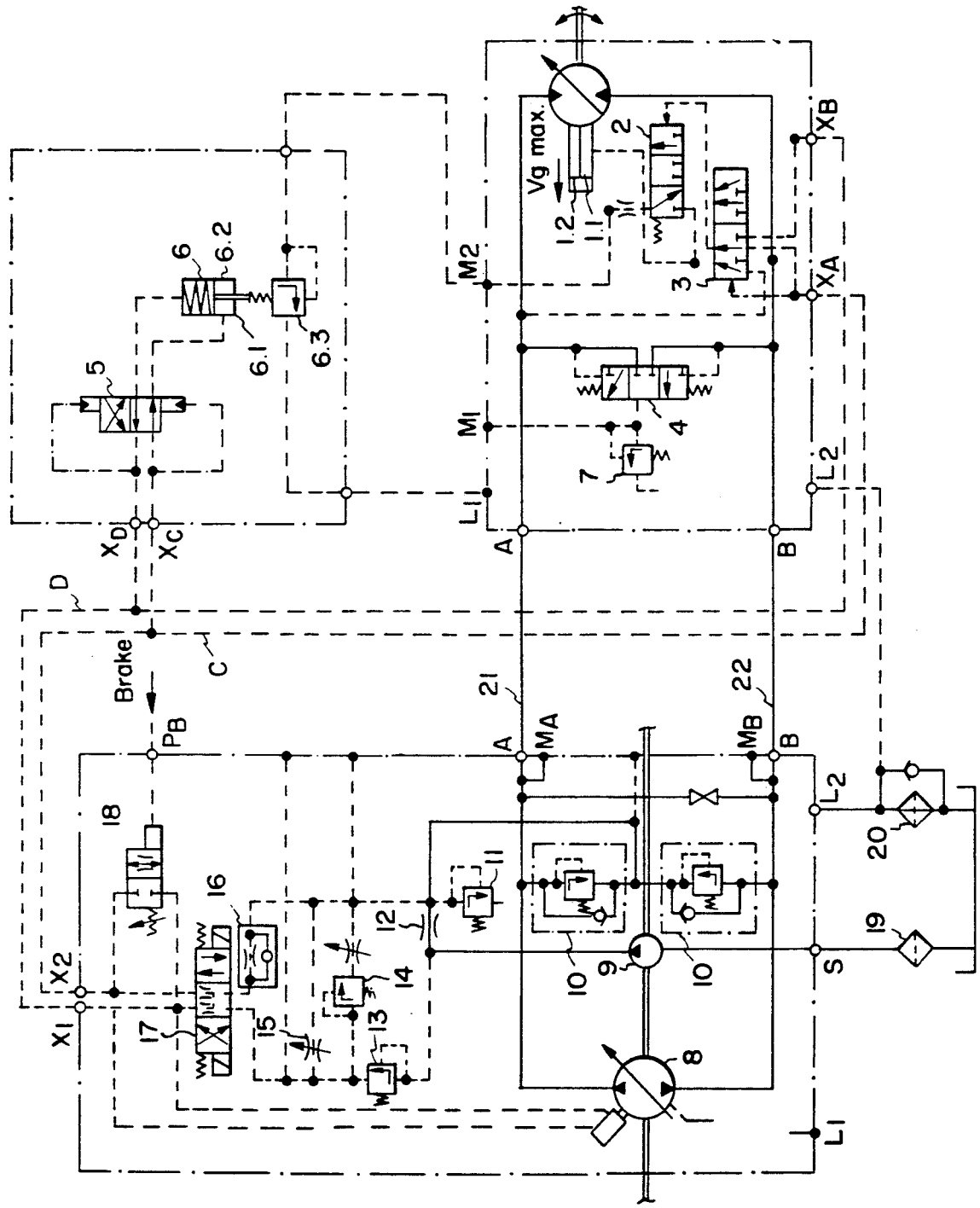
FIG. 1 illustrates a schematic diagram of connections of a hydrostatic mechanism in which an rpm dependent change in the variable displacement motor is provided in accordance with the invention.

In FIG. 1, a commercial variable displacement motor 1 is driven by a variable displacement pump 8. The variable displacement pump 8 is driven by a suitable power source, such as a diesel engine (not shown). Conduits 21 and 22 are connected to opposite sides of pump 8 and communicate high pressure fluid through connection A or B to the side of variable displacement motor 1, via a closed circuit. In a preferred exemplary embodiment, an axial piston motor having a diagonally situated axis is employed as the variable displacement motor 1. The working piston's angle position can be traversed using a control cylinder 1.1 in which a control piston 1.2 slides. Triggering the control cylinder 1.1 by admitting high pressure fluid to the proximal side of control piston 1.2 (on the right hand side of piston 1.2 in FIG. 1) initially holds the variable displacement motor 1 at its maximum possible absorption volume.

The initial displacement valve 2 has the task of conducting the high pressure fluid onto the side of the piston rod of the control cylinder 1.1 beginning at a certain actuating pressure (the same as a certain rpm of the diesel engine, 1,600 revolutions per minute, for example). The pressure surface on the distal side of the piston (on the left hand side) is twice as large as that on the proximal side adjacent the piston rod (on the right hand side) and therefore at a certain actuating pressure or a certain rpm, the motor is switched to the smaller absorption volume. The motor vehicle then moves more quickly. Switching the hydraulic motor 1 to the small pivoting angle occurs suddenly. An additional pressure valve allows the variable displacement motor 1 to rotate only as long as a given motor regulating pressure p is not exceeded. The adjusted motor regulating pressure p is derived from the maximum power pressure of the diesel motor (e.g., 2,500 revolutions per minute) and is given by the formula which in general describes the power in hydraulic motors and hydraulic pumps:

$$\text{Pressure } p = \frac{P \times 600}{n \times V}$$

P is the power in watts, n is the speed in revolutions per minute, and V is the absorption volume in cm$^3$ per revolution. The final effect is that the high pressure fluid cannot climb above a certain motor regulating pressure during acceleration after the switch point of the hydraulic motor.

When driving forward, the high pressure fluid is at connection A, while the filling or feeding pressure fluid is present at connection B. When driving backward, the pressures at connections A and B are reversed. The following is true for the actuating pressure: When driving forward, the actuating fluid pressure is present at the pressure connection $X_A$; when driving backwards it is at pressure connection $X_B$. The other line, whichever it is, conducts only the lower filling pressure. The pressure allocation valve 3 sees to it that the high pressure fluid and the actuating pressure fluid are fed correctly to the initial displacement valve 2 independent of the driving direction. For example, when driving forward the higher pressures at A and $X_A$ are conducted further.

The scouring valve 4 and the flushing pressure valve 7 are not necessary for the explanation of the invention.

The actuating fluid pressure is produced in the sequence of automatic operations controller of the variable displacement pump 8. Start-up and vehicle driving direction are preselected in the driving direction valve 17. In the neutral position of the driving direction valve 17, the lower filling fluid pressure operates in both control lines $X_1$ and $X_2$. If the driving direction valve 17 is switched to the left or right setting, then the driving, rpm-dependent, actuating fluid pressure operates in one control line and the filling fluid pressure operates in the other. The pump's feed stream is essentially determined by the difference in pressure operating on the variable displacement cylinder (actuating fluid pressure less filling fluid pressure). The difference in pressure necessary for starting is approximately 2 bar; it is approximately 20 to 15 bar for the maximum feed stream.

When the diesel engine (not shown) is idling, the entire feed stream of the filling and control pump 9 flows through the fixed control guide 12 and, after actuating the starting pressure valve 13, through the starting guide 15 into the filling circle. The pressure rises from this choking proportional to the increase in rpms. Given a switched driving direction valve 17, the difference between actuating fluid pressure and filling fluid pressure therefore works on the variable displacement cylinder of the variable displacement pump. The actuating fluid pressure for starting the vehicle at the appropriate diesel motor speed (starting speed) is adjusted with the choke or starting guide 15. The trigger valve 14 works parallel to the starting guide 15 after opening pressure is achieved. This valve serves to adjust the start-up speed at which the pump achieves its maximum rotation. The acceleration guide 16 limits the pump's rotation speed and therefore the vehicle's start-up acceleration.

A mechanical inching is superimposed on pump displacement, which depends on the rpms of the diesel engine. When the "inch" pedal is activated (comparable to the clutch pedal in a motor vehicle), the inch valve 18 is opened, and, depending on the path, the actuating fluid pressure is stripped so that, even at maximum drive speed, the pump rotates back to the null feed position. The inch valve can act as an operational brake or it can release power for the working hydraulics.

Figure 2:
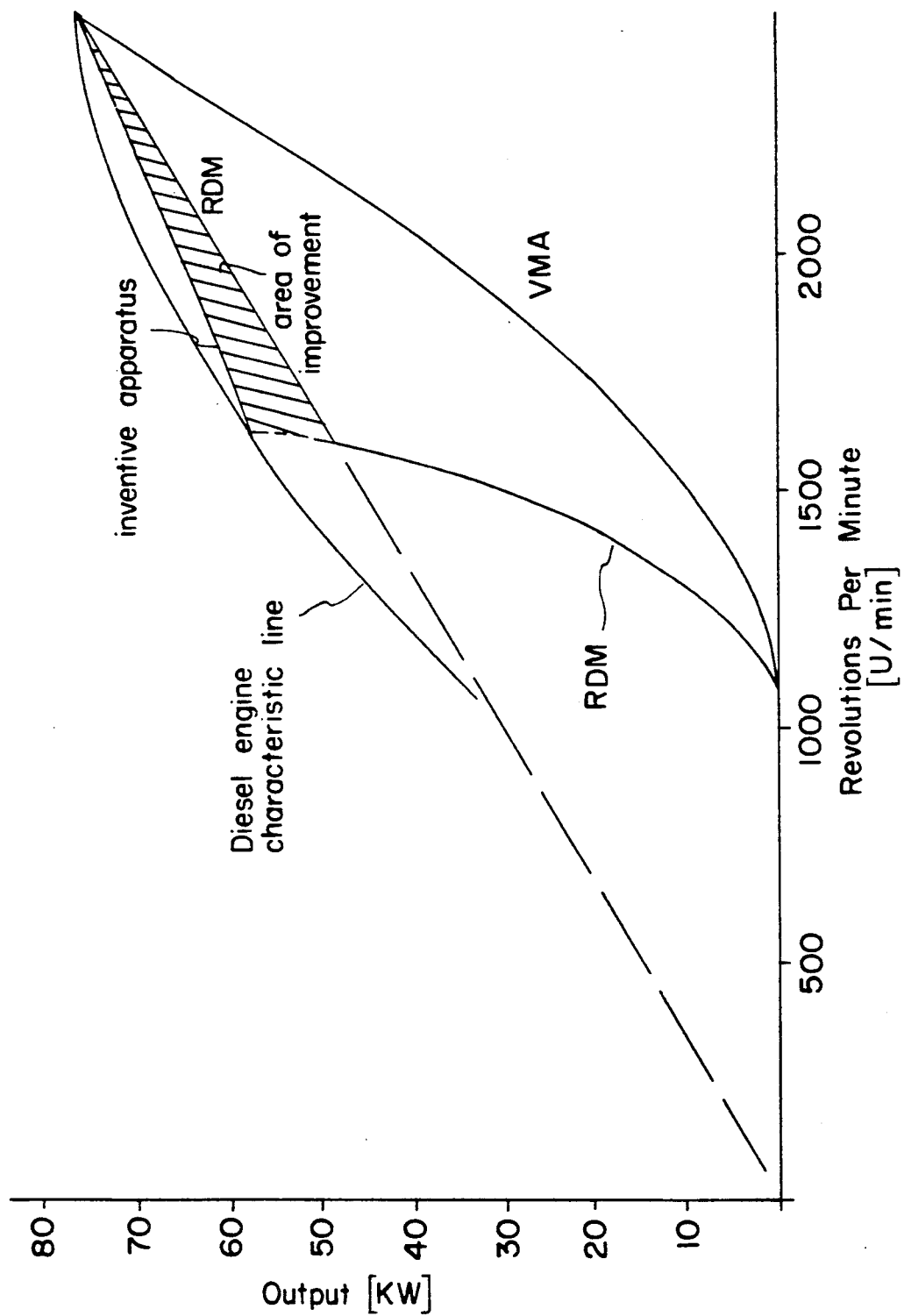
FIG. 2 is a graphical depiction of the power as a function of rpms for a diesel motor and hydrostatic mechanism provided according to the invention, in comparison with two known systems.

A correctly adjusted mechanism puts the vehicle in motion with diesel rpms of 1,000 to 1,200 revolutions per minute (see also the family of characteristics in FIG. 2). The hydraulic motor 1 is initially at a high absorption volume. The pump is then adjusted through the actuating fluid pressure in an initial phase to minimum feed volume, which is achieved at still relatively low speeds (1,500 to 1,700 revolutions per minute). The hydraulic motor then receives a signal from variable displacement valve 2 to adjust the variable displacement motor to a small absorption volume in a second phase of operation. Initial displacement of hydraulic motor 1 can be adjusted in order to adapt it to the pump's features and to the vehicle.

A portion of the mechanism explained to this point is known and is also used in practice to a certain extent. When driving a vehicle including a hydrostatic control system, the driver is inclined to drive as quickly as possible with relatively low rpms. This desire results from the constant noise from the motor, and from the goal of working quickly. The following is a description of the hydrostatic control system provided according to the invention for optimizing the acceleration and for improving the driving characteristics of a work vehicle operating under a partial load.

The special control means designated 5 and 6 are depicted at the top of FIG. 1. The function of the actuating fluid pressure allocation valve 5 is to compare the fluid pressures present in control lines C and D at connections $X_A$ and $X_B$, by admitting fluid from control lines C and D at connections $X_C$ and $X_D$ and passing these fluid pressures along to the regulator valve 6. Regulator valve 6 is preferably comprised of a cylinder 6.1 containing a piston 6.2 having a piston rod attached to its proximal side; a mechanical force, such as a spring, bears against the distal side of the piston and controls the valve element of the regulator valve 6. At the proximal side of the piston 6.2, the cylinder 6.1 is provided with a fluid connection that communicates with actuating fluid line C. On the distal side of the piston 6.2, the cylinder 6.1 is provided with a second fluid connection that communicates with the filling pressure fluid or feed pressure fluid conduit D. The piston rod extends through the end of the cylinder 6.1 and actuates a valve 6.3 positioned in conduit $M_2$-$L_1$ in response to the pressure differential applied to piston 6.2. The valve 6.3 therefore opens when the motor regulating pressure p at point $M_2$ is greater than the threshold pressure in regulator valve 6 determined by the pressure differential between the actuating fluid line C and the filling fluid line D.

It will be understood that the actuating fluid pressure will be conducted in line D, and the filling fluid pressure will be conducted in line C, if the direction of the work vehicle is reversed. The fluid pressures in lines C and D are always conducted, via pressure allocation valve 5, in such a way that the higher fluid pressure, i.e., the actuating fluid pressure, is transmitted to the piston rod side (proximal side) of the regulator valve 6 independent of the direction of travel of the vehicle.

The essential motor adjustment provided according to the invention is the pressure regulator 6, controlled by the actuating fluid pressure. Its function, depending on the difference in pressure between the actuating pressure fluid line and the filling pressure fluid line, which of course is dependent on the rpms of the diesel engine, is to limit the motor regulating pressure p on the piston side of the variable displacement motor 1. On one hand, the pressure regulator 6 is connected by connection $M_2$ to the motor regulating pressure of the variable displacement motor; on the other hand, it is connected by an escape connection $L_1$ to the housing of the variable displacement motor 1. At a certain difference in pressure between lines C and D at connections $X_A$ and $X_B$, the variable displacement motor 1 occupies a certain optimal pivoting angle.

The function of control elements 5 and 6 provided according to the invention is explained in greater detail using the family of characteristics illustrated in FIG. 2. The diesel engine characteristic line forms the basis for the power available. Furthermore, power consumption of a pump/motor combination having the known actuating power dependent displacement (VMA), as well as power consumption of a pump/motor combination having purely pressure regulation according to the prior art (RDM), are shown in this graph. The deciding novelty is that the motor regulating pressure for the variable displacement motor 1 is controlled depending on the rpms of the diesel engine by the additional pressure regulator 6. It is significant that the motor regulating pressure for the motor increases with decreasing diesel engine rpms in order to utilize the full diesel power available, even under a partial load.

The invention has recognized that when operating a hydrostatic system with a fully rotated pump, the motor regulating pressure must be higher in the average rpm range than at the diesel motor's point of maximum power. This substantial change to the prior concept of the mechanism leads to a clear improvement in acceleration and to significantly better utilization of the diesel engine under a partial load.

If a vehicle equipped with the mechanism provided according to the invention accelerates, the hydraulic motor 1, at a speed of, for example, 1,500 revolutions per minute, receives a signal from the initial displacement valve 2 to leave the large pivoting angle and to change to a small absorption volume. There is an increase in pressure in the high pressure fluid circuit because of the variable displacement motor's increase in speed and the change in absorption volume. This high fluid pressure is limited by the pressure regulator 6 in that the vehicle accelerates with a motor regulating pressure which corresponds to the possible high fluid pressure in the system which the diesel engine can produce at a pump rotating at its maximum. Since this possible high fluid pressure changes depending on the rpms of the diesel engine, the high fluid pressure on variable displacement motor 1 is adapted to the diesel engine's rpms. By adapting the system pressure to the diesel power available, the hydraulic components always run in the most efficient range. The diesel engine is fully utilized not just at the maximum rpms, as was previously the case, but also in the entire upper rpm range between 1,500 and 2,500 revolutions per minute. The maximum achievable speed of the vehicle is provided, the same as always. The improved performance achieved according to the invention is represented by the shaded region in FIG. 2. As shown therein, the output of the inventive apparatus closely approximates the available diesel engine power over a wide range of operating speeds.

Key

1 Variable Displacement Motor
1.1 Control Cylinder
1.2 Control Piston
2 Initial Displacement Valve
3 Pressure Allocation Valve
4 Scouring Valve
5 Actuating Pressure Allocation Valve
6 Actuating Pressure-Controlled Pressure Regulator
7 Flushing Pressure Valve
8 Variable Displacement Pump
9 Filling and Control Pump
10 High Pressure Limitation Valve
11 Filling Pressure Valve
12 Actuating Pressure Fixed Guide
13 Starting Pressure Guide
14 Trigger Valve
15 Starting Guide
16 Acceleration Guide
17 Driving Direction Valve
18 Inch Valve (Hydrostatic Operations Brake)
19 Filter
20 Radiator

I claim:

1. A variable displacement motor assembly comprising:
   (a) a hydraulic variable displacement motor having connections for receiving actuating fluid from an actuating fluid control line and high pressure fluid from a high pressure fluid line;
   (b) a control cylinder connected to the hydraulic variable displacement motor, for adjusting the absorption volume of the motor, the control cylinder including a control piston slidably engaged within the control cylinder, the control piston having a distal side and a proximal side adjacent to the variable displacement motor, the absorption volume of the variable displacement motor varying depending on the position of the control piston within the control cylinder;
   (c) initial displacement valve means for communicating high pressure fluid from the high pressure fluid line to the control cylinder when the pressure in the actuating fluid control line reaches a predetermined value, in order to form a motor regulating fluid pressure on the distal side of the control piston and shift the absorption volume of the variable displacement motor towards a minimum value; and
   (d) pressure regulator means for controlling the motor regulating fluid pressure on the distal side of the control piston depending on the pressure in the actuating fluid control line, wherein the pressure regulator means increases the motor regulating fluid pressure when the pressure in the actuating fluid line decreases.

2. The variable displacement motor assembly according to claim 1, characterized in that the motor regulating pressure is higher during operation of the power source in an average power range of the power source than during operation of the power source at maximum power.

3. The variable displacement motor assembly according to claim 1, characterized in that the adjustment of the absorption volume is a two-point adjustment from a maximum absorption value at a switch point to the minimum absorption volume.

4. The variable displacement motor assembly according to claim 1, characterized in that the variable displacement motor is an axial piston motor having a diagonally situated axis.

5. A hydrostatic system, which comprises:
   (a) a power source;
   (b) a variable displacement pump operatively connected to the power source;
   (c) an actuating fluid control line connected to the variable displacement pump, for carrying an actuating fluid at a pressure that varies depending on the number of revolutions per minute generated by the power source;
   (d) a high pressure fluid line connected to the variable displacement pump, for carrying high pressure fluid; and
   (e) a variable displacement motor assembly comprising:
      (i) a hydraulic variable displacement motor having connections for receiving actuating fluid from the actuating fluid control line and high pressure fluid from the high pressure fluid line;
      (ii) a control cylinder connected to the hydraulic variable displacement motor, for adjusting the absorption volume of the motor, the control cylinder including a control piston slidably engaged within the control cylinder, the control piston having a distal side and a proximal side adjacent to the variable displacement motor, the absorption volume of the variable displacement motor varying depending on the position of the control piston within the control cylinder;
      (iii) initial displacement valve means for communicating high pressure fluid from the high pressure fluid line to the control cylinder when the pressure in the actuating fluid control line reaches a predetermined value, in order to form a motor regulation fluid pressure on the distal side of the control piston and shift the absorption volume of the variable displacement motor towards a minimum value; and (iv) pressure regulator means for controlling the motor regulation fluid pressure on the distal side of the control piston depending on the pressure in the actuating fluid control line, wherein the pressure regulator means increases the motor regulation fluid pressure when the pressure in the actuating fluid line decreases.

6. The hydrostatic system of claim 5, wherein the power source comprises a diesel engine.

7. The hydrostatic system according to claim 5, characterized in that the variable displacement pump is an axial piston pump.

8. The hydrostatic system according to claim 5, characterized in that the variable displacement pump is controlled by a sequence of automatic operations.

9. The hydrostatic system according to claim 5, characterized in that a filling and control pump is driven by a driving axle of the variable displacement pump and produces the actuating fluid such that the actuating fluid has a pressure that depends on the rpms of the power source.

10. The hydrostatic system according to claim 5, characterized in that a driving direction valve places the actuating fluid in one of two lines depending on a driving direction of a work vehicle including the hydrostatic system.

11. The hydrostatic system of claim 5, wherein the variable displacement motor is an axial piston motor having a diagonally situated axis.

12. The hydrostatic system according to claim 5, characterized in that a switch point for the absorption volume of the variable displacement motor is adjustable at the initial displacement valve means depending on the rpms of the power source.

13. The hydrostatic system of claim 5, wherein the hydrostatic system further comprises a filling fluid line carrying filling fluid at a constant pressure that is lower than the pressure in the actuating fluid line, and the pressure regulator means adjusts the motor regulating pressure depending on a pressure differential between the actuating fluid pressure and the filling fluid pressure.

14. The hydrostatic system of claim 13, wherein the pressure regulator means comprises:
(a) a first valve comprising a cylinder containing a piston having proximal and distal sides, wherein a piston rod is attached to the proximal side of the piston and a mechanical force bears against the distal side of the piston, the cylinder having a fluid connection adjacent to the proximal side of the piston that communicates with the actuating fluid line and a fluid connection on the distal side of the piston that communicates with the filling fluid line; and
(b) a second valve connected to the piston rod of the first valve, the second valve being in communication with the motor regulating pressure, wherein the second valve is actuated by the piston rod of the first valve depending on the pressure differential between the actuating fluid line and the filling fluid line, so as to increase the motor regulating pressure when the pressure differential decreases.

15. The hydrostatic system of claim 14, wherein the pressure regulator means further comprises an actuating pressure allocation valve which conducts the actuating fluid pressure from the actuating fluid line to the fluid connection adjacent to the proximal side of the piston.

* * * * *

UNITED STATES PATENT AND TRADEMARK OFFICE
CERTIFICATE OF CORRECTION

PATENT NO. : 5,121,603

DATED : June 16, 1992

INVENTOR(S) : Axel Widemann

It is certified that error appears in the above-identified patent and that said Letters Patent is hereby corrected as shown below:

In column 8, line 65, i.e., claim 5, line 34, change

"regulation" to --regulating--.

In column 9, line 2, i.e., claim 5, line 39, change

"regulation" to --regulating--;

line 6, i.e., claim 5, line 43, change

"regulation" to --regulating--.

Signed and Sealed this

Second Day of November, 1993

Attest:

BRUCE LEHMAN

Attesting Officer

Commissioner of Patents and Trademarks